3,109,004
PREPARATION OF LOWER ALKYL - 4 - PHENYL-
N - PHENYLETHYL - ISONIPECATATES UNDER
CATALYTIC HYDROGENATION CONDITIONS
Bill Elpern, Walnut Creek, Calif., assignor to Sterling
Drug Inc., New York, N.Y., a corporation of Delaware
No Drawing. Filed Sept. 12, 1955, Ser. No. 533,893
2 Claims. (Cl. 260—294.3)

This invention relates to organic compounds and their preparation, and is concerned with an improvement in the substituent attached to the nitrogen atom of the piperidine ring in the class of chemical compounds identified as lower alkyl 4-phenyl-1-(hydrocarbyl)piperidine-4-carboxylates. In particular, it is concerned with lower alkyl 4-phenyl-1-(2-phenethyl)piperidine-4-carboxylates, their acid addition salts, and the preparation of these compounds.

U.S. Patent 2,167,351 broadly shows lower alkyl 4-phenyl-1-(substituted)piperidine-4-carboxylates where the 1-substituent is a monovalent hydrocarbon radical. Included among the specific examples are such compounds having 1-methyl and 1-benzyl substituents, the latter being of value primarily as intermediates for the former. The 1-methyl compounds are now known and accepted as effective, morphine-like central analgesics and atropine-like smooth muscle neurospasmolytics in the relief of severe pain. An outstanding example of these 1-methyl compounds is the highly effective, commercially available meperidine hydrochloride, ethyl 4-phenyl-1-methyl-piperidine-4-carboxylate hydrochloride. On the other hand, the intermediate 1-benzyl compounds have been found to have a decidedly lower analgesic activity compared with the 1-methyl compounds. For example, ethyl 4-phenyl-1-benzylpiperidine-4-carboxylate as its hydrochloride has been found to be only approximately one-fourth as effective an analgesic as meperidine hydrochloride when tested by the Bass-Vander Brook modification of the D'Armour-Smith method. This decrease in activity in going from 1-methyl to 1-benzyl would indicate that 1-phenylalkyl substituents are undesirable, and would thus lead investigators away from these compounds. This actually has been the case in the past twenty years—until I investigated the compounds of this invention.

I have now prepared lower alkyl 4-phenyl-1-(2-phenethyl)piperidine-4-carboxylates and surprisingly found them to be many time more effective as analgesics than the lower homologous 1-benzyl compounds. For example, ethyl 4 - phenyl-1-(2-phenethyl)piperidine-4-carboxylate as its hydrochloride is approximately ten times more active than the corresponding lower adjacent 1-benzyl homolog, thus, actually making this 1-phenethyl compound about two and one-half times as active as meperidine hydrochloride itself.

My compounds in free base form, having the formula

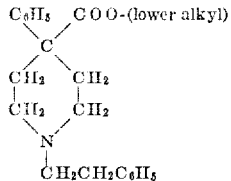

where the lower alkyl radical preferably has from one to six carbon atoms, are prepared by reacting a lower alkyl 4-phenyl-piperidine-4-carboxylate with a 2-phenethylating agent such as: (a) a 2-phenethyl ester of a strong inorganic acid or an organic sulfonic acid; or (b) phenylacetaldehyde under catalytic hydrogenation conditions. Suitable 2-phenethylating agents of type (a) include the 2-phenethyl bromide, chloride, iodide, sulfate, methanesulfonate, benzenesulfonate, paratoluenesulfonate, and the like, with the bromide being preferred. This reaction is carried out by heating the lower alkyl 4-phenylpiperidine-4-carboxylate with the 2-phenethyl ester in the presence or absence of a suitable solvent, but preferably in the presence of a solvent such as a lower alkanol. As a specific illustration of my invention, ethyl 4-phenyl-1-(2-phenethyl)piperidine-4-carboxylate is obtained by heating ethyl 4-phenylpiperidine-4-carboxylate with 2-phenethyl bromide, preferably in refluxing n-butanol with stirring in the presence of an alkaline agent such as sodium carbonate to neutralize the hydrogen halide formed by the reaction. Since the preferred intermediate, ethyl 4-phenylpiperidine-4-carboxylate forms an insoluble carbonate when treated with carbon dioxide, a convenient way of ascertaining whether the reaction is complete or not is merely to treat the reaction mixture with carbon dioxide the absence of a precipitate indicating completeness of the reaction. The product is isolated in free base form or in the form of its acid addition salt.

The same compound, ethyl 4-phenyl-1-(2-phenethyl)-piperidine-4-carboxylate, is formed when ethyl 4-phenyl-piperidine-4-carboxylate is reacted with phenylacetaldehyde and hydrogen under pressure in the presence of a hydrogenation catalyst effective to reduce carbon-to-nitrogen double bonds, e.g., palladium chloride on charcoal.

My new lower alkyl 4-phenyl-1-(2-phenethyl)piperidine-4-carboxylates are useful in the free base form or in the form of acid addition salts, and these salts are within the purview of the invention. The acids which can be used to prepare acid addition salts are preferably those which produce, when combined with the free base, salts whose anions are relatively innocuous to the animal organism in therapeutic doses of the salts, so that the beneficial physiologic properties inherent in the free base are not vitiated by side effects ascribable to the anions. In practicing my invention, I found it convenient to employ the hydrochloride salt. However, other appropriate acid addition salts are those derived from mineral acids such as hydrobromic acid, hydriodic acid, nitric acid, phosphoric acid, and sulfuric acid; and organic acids such as acetic acid, citric acid, tartaric acid, lactic acid, quinic acid, methanesulfonic acid, ethanesulfonic acid, and the like, giving the hydrobromide, hydriodide, nitrate, phosphate or acid phosphate, sulfate or bisulfate, acetate, citrate or acid citrate, tartrate or bitartrate, lactate, quinate, methanesulfonate and ethanesulfonate salts, respectively.

The following examples will further illustrate the invention without, however, limiting it thereto.

EXAMPLE 1

*Lower Alkyl 4-Phenyl-1-(2-Phenethyl)Piperidine-4-Carboxylate*

The preparation of these compounds is illustrated by the following preparation of ethyl 4-phenyl-1-(2-phenethyl)piperidine-4-carboxylate: A mixture of 233 g. of ethyl 4-phenylpiperidine-4-carboxylate, 186 g. of 2-phenethyl bromide, 1400 ml. of n-butanol and 185 g. of anhydrous sodium carbonate was refluxed with stirring for twenty-four hours. The reaction mixture was allowed to cool and was filtered. Concentration of this filtrate was started whereupon more sodium bromide separated; this inorganic salt was filtered off and washed with ether. The ether washings were added to the main filtrate and concentration in vacuo was continued. After most of the solvent had been removed, the residual material was poured into a crystallizing dish, whereupon solidification resulted. This solid [ethyl 4-phenyl-1-(2-phenethyl)piperidine-4-carboxylate] was dissolved in isopropanol (about 600 ml.); the resulting solution was treated with decolorizing charcoal and filtered. To the filtrate was added an excess of concentrated hydrochloric acid, whereupon there separated about 282 g. of ethyl 4-phenyl-1-(2-phenethyl)piperidine-4-carboxylate hydrochloride, M.P. 193–194° C.

*Analysis.*—Calcd. for $C_{22}H_{27}NO_2 \cdot HCl$: Cl, 9.48. Found: Cl, 9.36.

Following the above procedure but using methyl 4-phenylpiperidine-4-carboxylate, n-propyl 4-phenylpiperidine-4-carboxylate, isobutyl 4-phenylpiperidine-4-carboxylate, or n-hexyl 4-phenylpiperidine-4-carboxylate in place of ethyl 4-phenylpiperidine-4-carboxylate, there is obtained methyl 4-phenyl-1-(2-phenethyl)piperidine-4-carboxylate, n-propyl 4-phenyl-1-(2-phenethyl)piperidine-4-carboxylate, isobutyl 4-phenyl-1-(2-phenethyl)piperidine-4-carboxylate, or n-hexyl 4-phenyl-1-(2-phenethyl)piperidine-4-carboxylate, respectively.

EXAMPLE 2

*Ethyl 4-Phenyl-1-(2-Phenethyl)Piperidine-4-Carboxylate*

The following preparation illustrates the use of phenylacetaldehyde under catalytic hydrogenation conditions as the 2-phenethylating agent: A mixture containing 90.4 g. of ethyl 4-phenyl-1-benzylpiperidine-4-carboxylate, 176 ml. of ethanol, 17.6 ml. of acetic acid, 2.6 g. of palladium chloride, 2.6 g. of sodium acetate, 13 g. of charcoal and 53 ml. of water were subjected to hydrogen at 50 pounds pressure at room temperature. The reduction was completed in thirty minutes, yielding a solution of the starting material, ethyl 4-phenylpiperidine-4-carboxylate. To this solution was added 36 g. of phenylacetaldehyde and hydrogenation was continued for another thirty minutes at which time no additional hydrogen was taken up. Since only about half of the theoretical quantity of hydrogen had reacted, an additional 36 g. of phenylacetaldehyde (the phenylacetaldehyde used in this particular run presumably contained some of the polymerized aldehyde) was added and the hydrogenation continued for an additional one hour, after which time the theoretical quantity of hydrogen had reacted. The reaction mixture was filtered and the filtrate distilled under reduced pressure yielding, as a very viscous yellow gummy material, the product, ethyl 4-phenyl-1-(2-phenethyl)piperidine-4-carboxylate, which was dissolved in ether and treated with excess hydrogen chloride. The resulting white precipitate was recrystallized three times from acetone yielding about 3.5 g. of white crystalline ethyl 4-phenyl-1-(2-phenethyl)-piperidine-4-carboxylate as its hydrochloride, M.P. 193.0–194.8° C. (corr.).

*Analysis.*—Calcd. for $C_{22}H_{27}NO_2 \cdot HCl$: C, 70.68; H, 7.55; Cl, 9.48. Found: C, 70.95; H, 7.76; Cl, 9.32.

Pharmacological evaluation of ethyl 4-phenyl-1-(2-phenethyl)piperidine-4-carboxylate hydrochloride in aqueous solution administered subcutaneously by the Rat Thermal Stimulus Method of Bass and Vander Brook [J. Am. Pharm. Assoc., Sci. Ed., 41, 569–570 (1952)] has shown that this compound is approximately ten times as active an analgesic as ethyl 4-phenyl-1-benzylpiperidine-4-carboxylate hydrochloride and approximately two and one-half times as active an analgesic as ethyl 4-phenyl-1-methylpiperidine-4-carboxylate hydrochloride.

My lower alkyl 4-phenyl-1-(2-phenethyl)piperidine-4-carboxylates can be formulated in liquid preparations, e.g., aqueous or aqueous-ethanol menstruum, or in solid form, e.g., tablet or powder. The tablet formulation can be prepared using conventional excipients, and the powder can be compounded in capsule form. These preparations can be administered orally or, in the case of aqueous preparations, intramuscularly or intravenously.

I claim:

1. The process of preparing a lower alkyl 4-phenyl-1-(2-phenethyl)piperidine-4-carboxylate which comprises reacting a lower alkyl 4-phenylpiperidine-4-carboxylate with phenylacetaldehyde under catalytic hydrogenation conditions.

2. The process of preparing ethyl 4-phenyl-1-(2-phenethyl)piperidine-4-carboxylate which comprises reacting ethyl 4-phenylpiperidine-4-carboxylate with phenylacetaldehyde under catalytic hydrogenation conditions.

References Cited in the file of this patent

UNITED STATES PATENTS

| | | |
|---|---|---|
| 2,167,351 | Eisleb | July 25, 1939 |
| 2,486,795 | Kaegi | Nov. 1, 1949 |
| 2,528,928 | Weisblat | Nov. 7, 1950 |
| 2,589,205 | Pohland | Mar. 11, 1952 |
| 2,624,738 | Goldberg et al. | Jan. 6, 1953 |
| 2,716,134 | Reynolds et al. | Aug. 23, 1955 |
| 2,794,806 | Elam et al. | June 4, 1957 |
| 2,850,497 | Ehrhart et al. | Sept. 2, 1958 |
| 2,851,466 | Fancher | Sept. 9, 1958 |

OTHER REFERENCES

Simons: Industrial and Engineering Chemistry, volume 39, page 238, 1947.

UNITED STATES PATENT OFFICE

CERTIFICATE OF CORRECTION

October 29, 1963

Patent No. 3,109,004

Bill Elpern

It is hereby certified that error appears in the above numbered patent requiring correction and that the said Letters Patent should read as corrected below.

In the heading to the printed specification, line 3, for "-ISONIPECATATES" read -- -ISONIPECOTATES --; column 1, line 49, for "time" read -- times --; column 2, line 43, for "cirtic" read -- citric --.

Signed and sealed this 28th day of April 1964.

(SEAL)
Attest:
ERNEST W. SWIDER

EDWARD J. BRENNER
Commissioner of Patents

Attesting Officer